United States Patent [19]

Maruyama et al.

[11] Patent Number: 4,785,210
[45] Date of Patent: Nov. 15, 1988

[54] LINEAR MOTOR

[75] Inventors: Shigehisa Maruyama; Hideo Niikura, both of Tokyo, Japan

[73] Assignee: Sony Corporation, Tokyo, Japan

[21] Appl. No.: 50,398

[22] Filed: May 18, 1987

[51] Int. Cl.⁴ .................. H02K 41/00; G02B 15/00
[52] U.S. Cl. .................................. 310/12; 354/400; 350/429
[58] Field of Search ................................. 310/12–14; 318/135; 354/400, 234.1; 350/255, 429

[56] References Cited

U.S. PATENT DOCUMENTS 3,548,273  12/1970  Parodi et al. ................... 310/14 X
3,894,817  7/1975  Majoros ........................... 310/30 X
4,480,202  10/1984  Leutner et al. ................. 310/14 X

FOREIGN PATENT DOCUMENTS 55-22770  2/1980  Japan ............................. 355/8

Primary Examiner—Mark O. Budd
Assistant Examiner—Judson H. Jones
Attorney, Agent, or Firm—Hill, Van Santen, Steadman & Simpson

[57] ABSTRACT

The present invention is concerned with a linear motor adapted to produce a thrust in a linear direction, wherein the magnetic fluxes produced by coils of a stationary part are passed through a closed magnetic circuit including a gap of a movable part for lowering the power consumption and the manufacture costs while also reducing the size and weight of the motor.

11 Claims, 2 Drawing Sheets

LINEAR MOTOR

BACKGROUND OF THE INVENTION

1. Field of the Invention

This invention relates to a linear motor for developing a thrust force in the linear direction.

2. Description of the Related Art

In video cameras, electric rotating motors have been customarily used in association with automatic focusing systems or power zooming systems. The rotating motors are connected so that the rotational driving force developed by the motor will be transmitted through a speed reducing gear to a focusing ring or a zooming ring. However, the use of rotating motors in video cameras presents problems such as acoustic noises, vibrations, undesirable response characteristics and poor operating reliability, particularly with respect to the brushes or gearing.

In order to solve these problems, it has been tried in the prior art to drive the lens directly, that is, without the medium of brushes or speed reducing gears. However, a linear motor for this application has as yet not been realized because of the increased load when the lens is driven directly, so that problems are presented in the weight and size of the linear motor, as well as in power consumption and manufacturing costs.

SUMMARY OF THE INVENTION

It is a principal object of the present invention to overcome the aforementioned problems of the prior art and to provide a linear motor which does not present problems of excessive weight and size of the motor, and high power consumption and manufacturing costs, even when a video camera lens is moved directly by the motor.

In accordance with the present invention, there is provided a linear motor comprising first yoke means including a pair of magnetic yokes defining a gap therebetween, second yoke means coupled to said first yoke means, permanent magnet means for generating magnetic fluxes passing through said first and second yoke means, and coil means secured to said second yoke means for generating control magnetic fluxes for determining the relative position of said first yoke means and second yoke means.

According to the present invention, an extremely large thrust may be produced by a small current, since the energy developed by the coil is concentrated for the most part in the vicinity of the gap between the pair of magnetic yokes. The power consumption is, thus, lower even when the lens is moved directly. In addition, the linear motor of the present invention is simple in structure, small in size and light in weight, and it may be manufactured at reduced costs.

The above and other objects, features and advantages of the present invention will become apparent from the following detailed description of an illustrative embodiment thereof to be read in conjunction with the accompanying drawings, in which like reference numerals represent the same or similar elements.

DESCRIPTION OF THE PREFERRED EMBODIMENTS

A preferred illustrative embodiment of the present invention will be described hereafter by referring to the accompanying drawings. The present embodiment represents an application of the present invention to an automatic focusing electric motor for a video camera.

Figure 1:
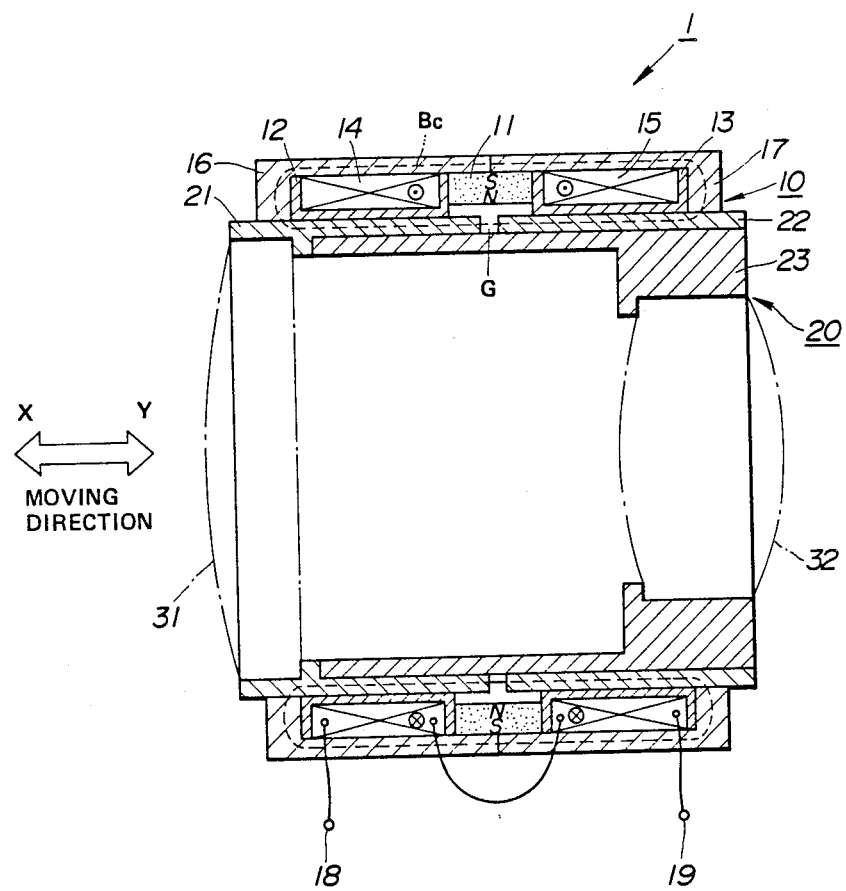
FIG. 1 is a longitudinal sectional view showing a linear motor according to a preferred embodiment of the present invention.

FIG. 1 shows a linear motor 1 of the present embodiment in a longitudinal cross section. The linear motor 1 is in the form of a hollow cylinder and made up of a stationary part 10 and a movable part 20 slidable relative to the stationary part 10. The stationary part 10 is provided with a permanent magnet 11, a pair of bobbins 12 and 13, a pair of coils 14 and 15 and a pair of stator yokes 16 and 17. The magnet 11 may, for example, be a rubber magnet and provided in a ring form approximately at the center of the cylinder astride the two stator yokes 16 and 17. The magnet 11 is magnetized in the direction of its thickness, that is, in the radial direction when the magnet is in the attached state, so that it is magnetized to the S pole and N pole at the outer and inner peripheries, respectively. The coils 14 and 15 are placed about the peripheral surfaces of the bobbins 12 and 13 arranged in turn on both axial sides of the magnet 11. These coils 14 and 15 are connected in series with each other, such as by a lead L, and an electrical voltage is applied across these coils at a pair of terminals 18 and 19.

The movable part 20 is provided with two isolated movable ferrous pieces 21 and 22 and a movable non-ferrous base 23. The ferrous pieces 21 and 22 act as magnetic yokes and are separated from each other by an air gap G. The magnetic circuit for the magnetic fluxes $B_C$ on the stationary part 10 produced by the coils 14 and 15 is a closed magnetic circuit formed by the stator yokes 16 and 17, the movable ferrous pieces 21 and 22 and the air gap G defined between the ferrous pieces. The outer peripheral surfaces of the movable ferrous pieces 21 and 22 are coated with Teflon (trademark) or other low friction material to present smooth surfaces for sliding relative to the inner peripheral surface of the stationary part 10. The movable base 23 is provided extending from the movable ferrous piece 21 to the movable ferrous piece 22 to maintain the relative positions of the movable ferrous pieces. The movable ferrous piece 21 and the movable base 23 are used simultaneously for lens mounting. A lens 31 is attached to the end of the movable ferrous piece 21, while another lens 32 is attached to the end of the movable base 23 in the illustrated embodiment.

Figure 2:
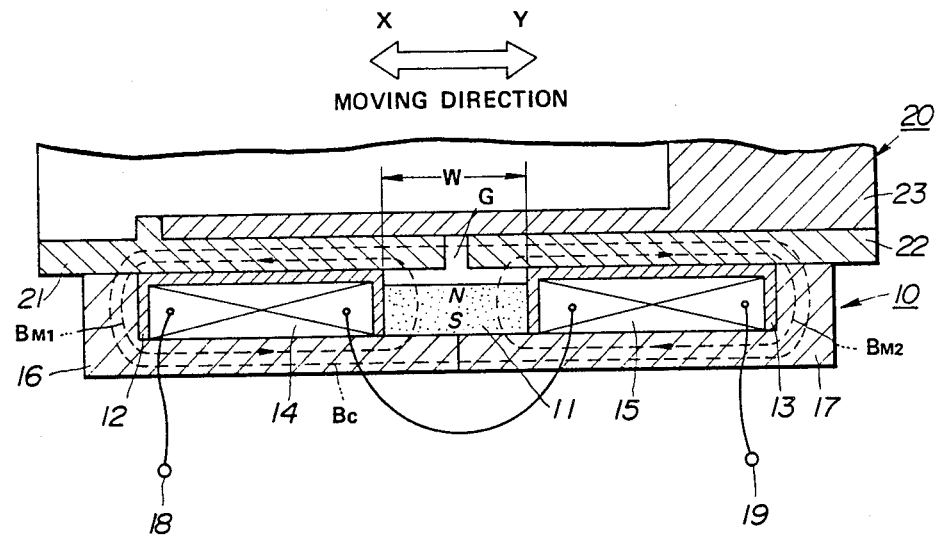
FIG. 2 is an enlarged sectional view showing essential parts of FIG. 1.

The operating principles of the linear motor 1 of the present embodiment is similar to that of an iron-core electric motor. Thus, as shown to an enlarged scale in FIG. 2, constant magnetic fluxes $B_{M1}$, $B_{M2}$ are emanating at all times from the magnet 11 and are encircling the coils 14 and 15, respectively. As a D.C. voltage is impressed across the terminals 18 and 19, current flows through the coils 14 and 15 so that the magnetic flux $B_C$ is produced by the coils 14 and 15. The direction of the magnetic flux $B_C$ is changed with the current flow direction. The magnetic fluxes $B_{M1}$ and $B_{M2}$ and the magnetic flux $B_C$ augment or cancel each other to produce a thrust in one direction so that the movable part 20 is shifted in the direction of arrow X or arrow Y. For example, when the current flows through the coils 14 and 15 in the direction indicated in FIG. 1, the right side end of the movable ferrous piece 21 adjacent the magnet 11 is magnetized to the S pole, while the left side end of the movable ferrous piece 22 adjaoent to the magnet 11 is magnetized to the N pole, so that a thrust is produced in the direction of the arrow Y and thus the movable part 20 is moved in this direction. The extent of movement of the movable part 20 is set by a width W of the permanent magnet 11.

With the present linear motor 1, an extremely large thrust is produced with a small current since the motor structure provides the equivalent of coils that are wound with a higher density at the ends of the movable ferrous pieces 21 and 22. Thus, the energy produced by the coils 14 and 15 is concentrated in the vicinity of the air gap G. This results in a smaller size of the magnet 11 and a lower power consumption. In addition, the linear motor is simplified in structure and reduced in size and weight so that it may be contained in a lens barrel. The manufacturing costs of the motor are also lowered.

Figure 3:
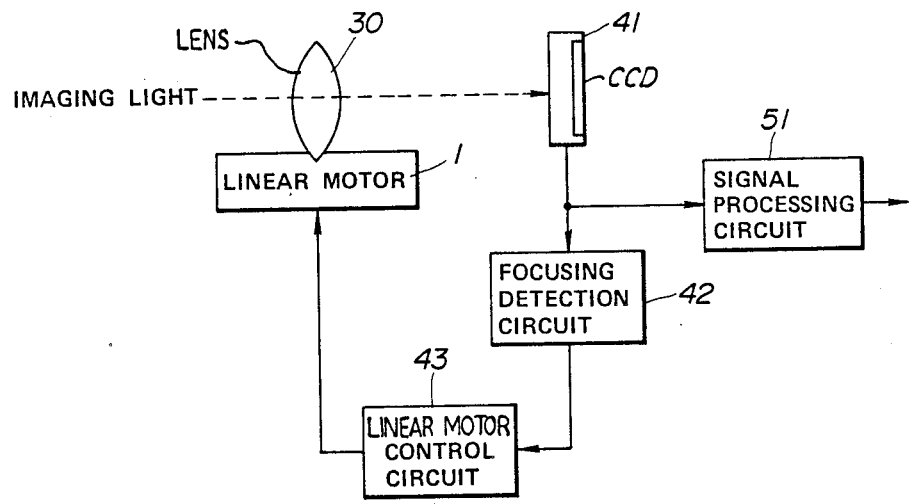
FIG. 3 is a block diagram showing an example of a closed loop control system of the invention.

It is noted that, when the D.C. voltage is simply applied across the terminals 18 and 19, the movable part 20 will become fixed at the terminal position of the movement stroke thereof defined by the width W of the magnet 11. It is therefore necessary in effect to dynamically control the position of the movable part 20, and hence the lenses 31 and 32, by using a closed loop control system, such as shown for example in FIG. 3. In FIG. 3, the imaging light falls on a solid state image pickup element or a charge coupled device 41 (CCD) through a lens system 30 corresponding to the aforementioned lenses 31 and 32. The signals from the CCD 41 are supplied to a focusing detection circuit 42 where the state of focusing is detected. The detection signals from the focusing detection circuit 42 are supplied to a linear motor control circuit 43, from which a control signal is supplied to the linear motor 1 on the basis of the detection signal. The position of the lens system 30 is controlled by the linear motor 1 in accordance with the control signal. The closed-loop focusing control system is made up of the lens system 30, the CCD 41, the focusing detection circuit 42, the linear motor control circuit 43 and the linear motor 1 for performing a dynamic focusing control operation. In the embodiment of FIG. 3, the signals from the CCD 41 are also supplied to a signal processing circuit 51 such that CCD 41 is used for focusing detection and imaging simultaneously. However, in an alternate embodiment, an imaging tube may be used in lieu of the CCD 41.

Also, while the stationary part 10 is provided with the two coils 14 and 15, the movable part 20 may be moved by using any one of these coils. A filler of nonmagnetic material may also be inserted in the magnetic gap G. It is also unnecessary to provide the coil or magnet on the overall surface of the linear motor.

The present invention may be adapted not only for a video camera but for any other camera, such as a still camera or any apparatus other than a camera.

Although other modifications and changes may be suggested by those skilled in the art, it is the intention of the inventors to embody within the patent warranted hereon all changes and modifications as reasonably and properly come within the scope of their contribution to the art.

We claim as our invention:

1. A linear motor, comprising:
   first yoke means including a pair of magnetic yokes having a gap separating a first of said yokes from a second of said yokes;
   second yoke means slidably coupled to said first yoke means;
   permanent magnet means for generating magnetic fluxes passing through said first and second yoke means; and
   coil means secured to said second yoke means for generating control magnetic fluxes for determining the relative position of said first yoke means and second yoke means.

2. A linear motor according to claim 1, wherein said second yoke means has a first leg portion slidably coupled to one of said yokes of said first yoke means,
   a second leg portion of said second yoke means slidably coupled to the other yoke of said first yoke means, and
   a connecting portion extending between said first and second leg portions, said permanent magnet means and said coil means being positioned within a space defined by said first yoke means and second yoke means.

3. A linear motor according to claim 2, wherein said coil means includes a first coil and a second coil connected in series with said first coil, and said permanent magnet means being positioned between said first and second coils.

4. A linear motor according to claim 3, wherein said permanent magnet means is positioned in opposition to said gap of said first yoke means.

5. A linear motor according to claim 1, wherein said yokes of said first yoke means have cylindrical forms and said yokes of said second yoke means also have cylindrical forms so as to conform to a concentric linear motor.

6. A linear motor as claimed in claim 5, wherein said concentric linear motor is adapted to move a lens system of a camera.

7. A linear motor as claimed in claim 6, wherein
   said first yoke is concentrically disposed within said second yoke,
   said first yoke being fixedly mounted to lens elements of said lens system so that sliding movement of said first yoke relative to said second yoke effects focusing of said camera.

8. A linear motor as claimed in claim 2, wherein said first leg portion is a first bobbin having a first coil, said second leg portion is a second bobbin having a second coil, and
   said permanent magnet means includes a permanent magnet mounted in said second yoke means between said first and second bobbins.

9. A linear motor as claimed in claim 5, wherein said permanent magnet means includes an annular permanent magnet magnetized in a radial direction.

10. A linear motor as claimed in claim 3, further comprising:
    a closed loop focusing control having:
      an image receiving element,
      a focusing detection element connected to said image receiving element, and
      linear motor control circuit connected to said focusing detection element, said linear motor control circuit connected to said first and second series connected coils.

11. A linear motor according to claim 1, wherein said second yoke means has:
- a first leg portion slidably coupled to one of said yokes of said first yoke means;
- a second leg portion of said second yoke means slidably coupled to the other yoke of said first yoke means; and
- a connecting portion of said second yoke means extending between said first and second leg portions, said permanent magnet means and said coil means being positioned between said first leg portion and said second leg portion and in a space defined between said connecting portion and said first yoke means to form a magnetic circuit through said first and second leg portions, said connecting portion, and said first yoke means and across said gap.

* * * * *